Patented May 15, 1928.

1,669,674

UNITED STATES PATENT OFFICE.

CHARLES J. ROMIEUX, OF ELIZABETH, NEW JERSEY, ASSIGNOR TO AMERICAN CYANAMID COMPANY, OF NEW YORK, N. Y., A CORPORATION OF MAINE.

PHENOL RESIN AND METHOD OF MAKING THE SAME.

No Drawing.    Application filed April 29, 1925. Serial No. 26,824.

This invention relates to condensation products, more particularly to artificial resins of the reactive type.

It is well known that phenol may be caused to react with formaldehyde in the presence of a catalyst, generally an alkali, whereby there is produced a resin which is fusible and soluble in the ordinary organic solvents and which is potentially reactive. Such resins may be used per se or may have incorporated therewith a laminated, fibrous or other filler and the material then subjected to heat, or heat and pressure, to first cause the resin to fuse and flow and then to become hard, insoluble and infusible.

Among the methods for making such resins there is the bakelite process, wherein phenol or cresol or mixtures thereof are caused to react with formaldehyde solutions in the presence of alkaline catalysts, such as caustic soda or ammonia. Generally the amount of alkali used is one-fifth of a mol per mol of phenol and often the amount is much higher. In other processes different catalysts are used, for instance, various inorganic and organic compounds, such as ammonium chloride, alkali earth metal hydroxides and carbonates, aniline, benzylamine and others, have been proposed.

Resins of this character are of great value for numerous commercial applications, being eminently adapted for molding articles for electrical and mechanical uses. However, the phenol or cresol used therein is relatively expensive and it is desirable to replace the same by a cheaper material. Therefore, experiments have been conducted with a view to utilizing phenolic bodies which are less expensive, such as the higher boiling phenols and other bodies which may be obtained from the tars produced in the low temperature distillation of coal. One proposed method was to boil the phenols from low temperature tar, having a range of boiling points between 150° and 250° C., with formaldehyde, and then adding one-fifth of a mol of ammonia thereto to accelerate the combination. As will be noted, the boiling point of these phenols was so low that undoubtedly they contained considerable quantities of phenol and cresol, and the resin formed thereby was permanently soluble and fusible and was incapable of being hardened. Another proposed method was to cause a reaction between xylenol and formaldehyde, with about 16% of benzylamine based on the xylenol present, as a catalyst. The material, after the reaction was complete, was brittle, fusible and soluble, and it did not possess any great degree of hardness.

Still another proposed method was to take the phenols from the low temperature distillation of coal, boiling between 230° and 320° C., with or without preliminary purification, and condense the same in the proportion of 100 parts of the phenols, 40 parts of 40% formaldehyde solution and 1 to 5 parts of strong ammonia solution having a specific gravity of .880. This reaction resulted in a resin which was permanently soluble and which was not reactive in the sense that it could not be rendered infusible and insoluble by the application of heat.

None of the resins formed by the reaction of a high boiling phenol and formaldehyde in accordance with the proposed methods provided a material which was commercially useful. In no case could the resin be used for molding purposes and in many cases the fully reacted resin was neither infusible nor insoluble. Although, in accordance with the prior art, it was perfectly feasible to cause a reaction of some kind to take place to produce a resinous substance, no one heretofore had been able to control the reaction in such a manner as to with certainty obtain a definitely reactive resin which was fusible and soluble and which, at will, could be hardened with heat, as in the case of the well-known bakelite.

My invention is intended to obviate the difficulties previously encountered in the production of resins from the higher boiling phenols, it being among the objects thereof to provide a method of making resins which shall result in a product which is reactive and which may at will be controlled to give either a fusible and soluble or an infusible and insoluble product.

The difficulties involved in the production of moldable resins from the higher boiling phenols have been recognized to be so great that no one up to the present time has attempted to market such resins. I have conducted a long series of experiments to determine the character of the reactions which take place in the formation of moldable resins, both from phenol and cresol, and from the higher boiling phenols. As a result I have concluded that the secret of the production of reactive resins from the higher boiling phenols lies in the amount of catalyst used. Whereas hitherto various experimenters have used considerable amounts of alkaline catalysts, I have found that if the amount thereof is greatly reduced, the reaction whereby a moldable resin is formed may be caused to take place under perfect control, and the reaction may be arrested at various stages in a manner analogous to the various stages of condensation of phenol and formaldehyde, forming bakelite A, B, and C. I have found that when caustic soda is used as the catalyst, the amount thereof to be used to promote the raction should be in all cases less than .5% of the weight of the higher boiling phenol present. Better results are usually obtained when the amount of alkali is less than .1% and, in fact, a much less quantity of alkali, say from .03 to 0.5% gives probably the best results.

As an example of the practice of my invention, I may take the so-called "crude cresylic acid" which contains practically no phenol and generally only a small amount of cresol, the major portion thereof being the higher boiling phenols, such as the xylenols and others. I have successfully used in my process the oil known as Barrett high boiling cresylic acid, the major portion of which boils between 209° and 223° C., pale cresylic acid (97-99%) boiling between 203° and 223° C., tariff specification cresylic acid boiling between 211.5° and 226° C. and still higher boiling cresylic acids boiling between 223° and 280° C.

One hundred parts of any of the above mentioned oils or mixtures thereof are mixed with 24.5 parts of paraformaldehyde, or its equivalent of formaldehyde solution, providing an approximately equamolecular mixture of the two substances. Sodium hydroxide, in an amount equal to .03% by weight of the cresylic acid in excess of the amount necessary to neutralize the acidity of the formaldehyde used, is added thereto and the entire mixture is heated to boiling in an oil bath under a reflux condenser to prevent loss of material for 1½ hours. The two layers formed by the reaction are separated and the resinous portion is boiled in the open air to expel water, and to increase the viscosity to the desired point. The resin thus formed may either be poured into a suitable mold and dried in an oven at say 85° C. for seven days to complete the reaction and render the resin insoluble and infusible, or the resin may be mixed with a filler, such as wood flour, and molded at a temperature of say 160° to 180° C. for a short time, say five minutes. The hardened, insoluble and infusible product may be removed from the mold while hot without damage to the article and it may be exposed to a temperature of 150° C. for a long time, several hours, without blistering. This is a decided advantage over the ordinary bakelite resins, which after molding must be cooled in order to prevent blistering of the surface thereof. In the case of the bakelite resins there is present a considerable amount of gas which builds up a relatively high pressure because of the heat of molding and it becomes necessary to cool the same in the mold to reduce the pressure of the gases to a safe point, whereas in my material substantially no gas pressure is developed and, therefore, the molded article may be ejected from the press while still hot without danger of blistering the surface thereof.

I may take 100 parts of crude cresylic acid, mix the same with 80 parts of 40% formaldehyde solution and add sufficient caustic soda to neutralize the acidity thereof. The amount of alkali necessary for this purpose will vary with the acidity of the formaldehyde but in general I have found that it requires at least .01% of alkali based upon the weight of the cresylic acid in the mixture. The materials are heated to boiling, as in the example given above, but the time necessary for refluxing is considerably longer. The fully cured resin is not as hard as the resin made with a slightly greater amount of alkali and the time for curing is greater.

It will be noted that, as the result of my invention, I am enabled to make resins completely analogous to the bakelite resins in that my resins may be taken through the same stages as bakelite and with the certainty that if the procedure is duplicated, duplicate results will be obtained. There are no difficulties involved in the process and the apparatus used is of the same simple character as that used in making bakelite. Because of the relatively low cost of the principal ingredient, the crude cresylic acid, as compared to the relatively high cost of phenol, my resin may be made at a considerably less cost than bakelite. In most respects my resin is the equal of bakelite, and in some respects superior thereto. For instance, it may be ejected from the mold while hot, thereby increasing the production of the press and decreasing the cost of molding. Because of the very small amount of alkali used in the condensation, the dielectric properties thereof are considerably better than those of bakelite.

Although I have described my invention setting forth several embodiments thereof, it is to be understood that my invention is not limited to the examples given. For instance, formaldehyde solution and paraformaldehyde may be used interchangeably, and aldehydes, such as furfural, acetaldehyde, or other bodies containing one or more methylene groups may be substituted therefor. Various types of high boiling phenolic oils may be used and the source thereof may be from the tars obtained from the distillation of wood, the high temperature and low temperature distillation of coal, the distillation of shale and the like. Any oils containing a major portion of the higher boiling phenols, that is, any phenolic oil, the major portion of which boils above 202° C., may be successfully used in my process. It is to be understood that although I may use an oil having a wide range of boiling points, equally as good if not better results may be obtained by separately treating fractions therefrom having narrower ranges of boiling points. My invention is not confined to the use of caustic soda as it is apparent that various alkaline materials, such as caustic potash, ammonia, hydrate of lime and others may be substituted therefor.

It will be noted that my invention differs from the previously proposed methods for producing resins from the higher boiling phenols in the extremely small amount of alkaline catalyst used therein, as compared to the amounts previously used. For instance, one prior method contemplated the condensation of phenols boiling between 150° and 250° C. with 1/5th of a mol of ammonia as a catalyst. This is equivalent to approximately 7.3% of ammonium hydroxide based on the weight of phenols present. Another proposed process contemplated the condensation of 100 parts of high boiling phenols with 40 parts of 40% formaldehyde in the presence of 1 to 5 parts of strong ammonia. Because of the relatively small amount of formaldehyde used, it is well known that only a portion of the phenols present will react to form a resin, the remainder of the phenols either being evaporated or acting as a solvent for the resin. We may therefore assume that but 50 parts of the phenols react with the formaldehyde present, and therefore the amount of alkaline catalyst used is equivalent approximately to 1.5 to 7.3% of the weight of the phenols acted upon. My invention contemplates the use generally of considerably less than .1 per cent of alkali and in practically no case does the amount exceed .5%.

In the claims I have used the term "high boiling phenol" to indicate either a definite phenol or a mixture of phenols having a boiling point over a range such that there is, at the most, only a minor proportion of phenol or cresol therein. In practically all cases the boiling point of such a material would be above 200° C. The amount of alkali present, as set forth in the claims, is based upon the content of phenols and not upon the entire mixture.

What I claim is:

1. A method of making potentially reactive condensation products which comprises providing a mixture of a phenol boiling above 202° C. and formaldehyde, adding alkali to an amount less than .1% based on the phenol present thereto and causing a reaction therebetween to produce a reactive resin.

2. A method of making potentially reactive condensation products which comprises providing a mixture of a phenol boiling above 202° C. and formaldehyde, adding .03% to .05% of alkali based on the phenol present thereto and causing a reaction therebetween to produce a reactive resin.

3. A condensation product of a phenol boiling above 202° C. and formaldehyde, containing alkali to an amount less than .1% based on the phenol present and being potentially reactive.

4. A condensation product of a phenol boiling above 202° C. and formaldehyde, containing .03 to .05 per cent of alkali based upon the phenol present and being potentially reactive.

In testimony whereof, I have hereunto subscribed my name this 27th day of April, 1925.

CHARLES J. ROMIEUX.